TELEVISION RECEIVER WITH ADJACENT SOUND TRAP CONTROL

Filed Oct. 27, 1961

INVENTOR.
Adam W. Przybyszewski
BY
Francis W. Crotty
Atty.

United States Patent Office 3,204,025
Patented Aug. 31, 1965

3,204,025

TELEVISION RECEIVER WITH ADJACENT SOUND TRAP CONTROL

Adam W. Przybyszewski, Niles, Ill., assignor to Zenith Radio Corporation, a corporation of Delaware Filed Oct. 27, 1961, Ser. No. 148,180
5 Claims. (Cl. 178—5.8)

Figures 1, 2:
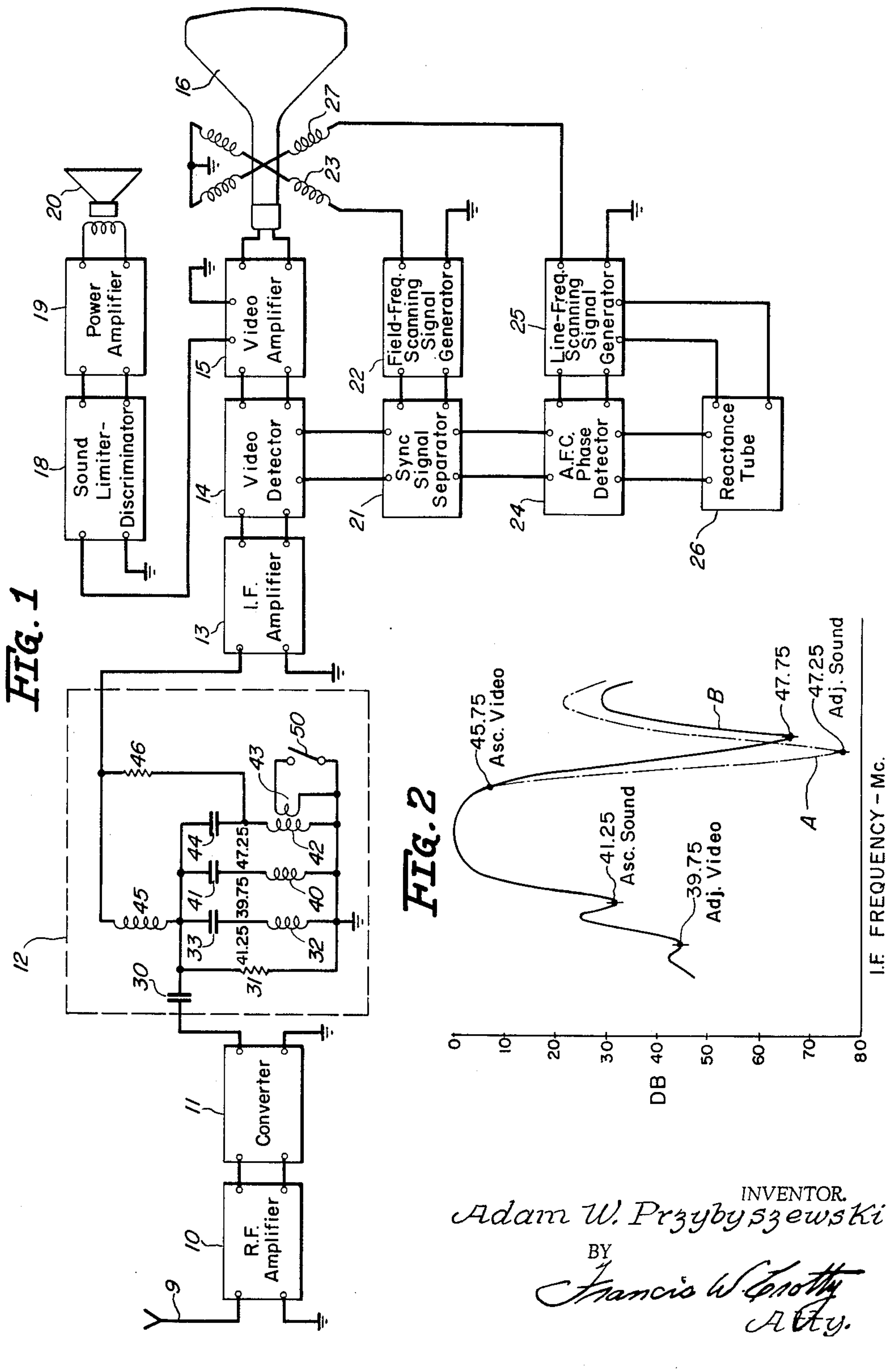

This invention relates to wave signal translating apparatus and more particularly to bandpass circuitry which may be employed to improve the quality of the reproduced image of a television receiver.

In the reception of television signals, it is conventional practice to heterodyne a selected incoming signal with a locally generated signal to develop an intermediate-frequency signal of a particular frequency. The intermediate-frequency bandwidth of the receiver is shaped to accommodate both the video-frequency and audio-frequency carrier signals as well as their bands of modulation components so that the entirety of the original signal may be translated without distortion.

In accordance with the signal specifications adopted by the Federal Communications Commission, each television channel occupies a total bandwidth of approximately 6 megacycles and the channels serving a given reception area are frequently positioned adjacent one another. To prevent interference between the transmitted carrier signal components of adjacent channels and yet keep receiver operation relatively simple, the radio-frequency and intermediate-frequency sections of a television receiver have become undesirably complex.

To reduce adjacent-channel interference various filters and traps are employed. More specifically, it has been customary to provide an attenuation filter tuned to the video carrier of the lower adjacent channel which in conventional receiver design is positioned at an intermediate frequency of 39.75 megacycles. Another filter is provided to reject or attenuate the sound carrier of the upper adjacent channel which occurs at an intermediate frequency of 47.25 megacycles. Obviously, these filters fall on opposite sides of, and therefore bracket, the frequency band of the selected television channel for which the intermediate-frequency sound and video carrier components fall at 41.25 megacycles and 45.75 megacycles respectively. Necessarily, the adjacent-channel traps have an influence on the passband characteristic of the intermediate-frequency channel even over the portion of the frequency spectrum which includes the desired channel signal. Moreover, if the receiver is of the intercarrier type, it is conventional practice that some attenuation be given to the accompanying sound carrier so that beat frequencies which may develop between it and the accompanying video carrier are unnoticed in the reproduced image. This attenuation is provide by a sound carrier trap circuit which has a resonant frequency of 41.25 megacycles.

Of course, there are certain geographical areas in which there are no stations transmitting on adjacent channels and in such instances the filters employed for rejecting adjacent channel sound and video signals are not required. Since these filters not only reject the unwanted frequencies but also reject part of the selected channel and cause phase non-linearity resulting in reproduced images of poorer quality than might be obtainable, it is advantageous that they be omitted in areas where there are no adjacent-channel interference problems.

It is a primary object of this invention, therefore, to provide circuitry which overcomes the aforementioned disadvantages of conventional receivers.

It is another object of this invention to provide apparatus for selectively increasing the performance of a television receiver by modification of its frequency response characteristic.

It is still another object of this invention to provide apparatus which selectively enlarges the bandpass characteristic of a television receiver to result in a reproduced image of increased quality.

In accordance with the invention, a television receiver for reproducing information from adjacent channel transmitted signals, each having a sound-signal-component frequency and a picture-signal-component frequency, comprises circuit means for selecting one of the transmitted signals. In addition, the receiver includes means coupled to the first-mentioned circuit means for translating the selected signal and for rejecting the sound-signal-component frequency of the adjacent one of the transmitted signals. Additionally there are means, including a switch coupled to the sound-signal-component frequency rejecting means for rendering it at least partially ineffective.

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

FIGURE 1 is a schematic diagram of a television receiver embodying the wave signal translating apparatus of the invention; and FIGURE 2 is a graphical representation of certain operating characteristics of the receiver of FIGURE 1 illustrating advantages obtained with the invention.

In FIGURE 1, incoming composite television signals are intercepted by an antenna 9 and impressed on a radio-frequency amplifier 10 of one or more stages which includes channel-selecting means for selecting one of the transmitted signals available in the receiver location. Amplified television signals from radio frequency amplifier 10 are heterodyned with locally generated oscillations in a converter 11 to provide an intermediate-frequency signal corresponding to the intermediate frequency of the receiver. The frequency response of the IF channel is determined by the usual interstage coupling transformers and the like and also by a filter network 12. Filter 12 is coupled to the channel selecting means of the receiver through converter 11 and is utilized to translate the selected program signal while rejecting the sound-signal-component frequency of the television signal that is adjacent the one selected for utilization. The intermediate-frequency signal is applied through network 12 to an intermediate-frequency amplifier 13 of one or more stages. The amplified signal from intermediate-frequency amplifier 13 is impressed upon a video detector 14 of conventional construction. Detected components from video detector 14 are applied to a video amplifier 15 which translates the detected video components to the input circuit of a cathode ray tube 16 or other image reproducing device.

The receiver of FIGURE 1 is of the intercarrier-sound type which is well known in the art. Detector 14 supplies to video amplifier 15 an intercarrier-sound signal component along with the composite video signal and a sound take-off is provided in the output of the amplifier. The extracted intercarrier-sound signal component is amplitude limited and demodulated in a limiter-discriminator 18 and the audio frequency output from limiter-discriminator 18 is impressed upon a power amplifier 19 and then onto a loudspeaker 20 or other sound reproducing device.

The detected and amplified composite video signal from detector 14 is also applied to a synchronizing signal separator 21 which derives line frequency and field frequency synchronizing signal pulses for driving the scanning apparatus associated with the image reproducing device 16. Field frequency synchronizing signal pulses from synchronizing signal separator 21 are supplied to a field frequency scanning signal generator 22 which drives a field frequency scanning coil 23. Line frequency synchronizing signal pulses from separator 21 are applied to an automatic frequency control (AFC) phase detector 24 for phase comparison with the output of a line frequency scanning signal generator 25. The output of the AFC detector 24 is supplied to a reactance tube 26 which controls the frequency of generator 25 to maintain synchronism with the incoming signal. The output of line signal generator 25 is supplied to a line frequency deflection coil 27. If desired automatic gain control of the radio-frequency and intermediate-frequency stages may be provided for in conventional fashion.

With the except of filter network 12, the construction and operation of the receiver of FIGURE 1 are quite conventional. It has been found convenient to illustrate a receiver of the intercarrier sound type since the invention is of particular advantage as applied to such receivers, but it is to be clearly understood that the invention may be applied with advantage to receivers utilizing a separate sound channel or other type of sound system.

More particular consideration will now be given to filter network 12 which provides protection against adjacent channel interference as well as weighting of the sound carrier component of the selected television program signal. The filter comprises a coupling capacitor 30 and a shunt resistor 31 which couple the output signal from converter 11 to the filter network with impedance matching. In parallel relationship with resistor 31 is an companying sound carrier rejection filter or trap tuned to 41.25 megacycles and comprising the series combination of an inductor 32 and a capacitor 33. Also coupled in parallel relationship with resistor 31 is an adjacent channel video frequency trap comprising the series arrangement of an inductor 40 and a capacitor 41 together tuned to 39.75 megacycles. There is still another trap for the adjacent-channel sound carrier. This trap comprises the series combination of an inductor 42 and a capacitor 44 which together have a series resonant frequency of 47.25 megacycles. One end of an inductor 45 is coupled to the junction of the three shunt-connected series resonant traps and its remaining end is coupled to the input of IF amplifier 13. A resistor 46 connects between the same input of amplifier 13 and the junction of inductor 42 and capacitor 44 of the 47.25 megacycle sound trap to couple a portion of the IF signal to amplifier 13 in phase opposition to that passing through inductor 45 for reasons to be described more fully hereinafter. Inductor 42 of the 47.25 megacycle trap circuit may be considered the primary winding of a transformer having a secondary winding 43. Winding 43 is reactively or flux coupled to winding 42 and is electrically coupled between ground and one terminal of a switch 50. Switch 50 and winding 43 together serve as means for rendering the sound component rejection trap at least partially ineffective. The remaining terminal of switch 50 is grounded so that when closed it, in effect, produces a shorted secondary for transformer 42, 43.

The influence of filter network 12 in shaping the IF response characteristic will be explained in conjunction with FIGURE 2. Trap 40, 41 puts a notch in the response characteristic at 39.75 megacycles which attenuates the video carrier component of the lower adjacent channel signal by approximately 45 decibels (db). With this magnitude of rejection, the adjacent channel video components do not normally produce interference observable by a viewer. Trap 32, 33 establishes another notch in the response characteristic at 41.25 megacycles which attenuates the sound carrier component of the selected channel by 32 db as required to prevent image distortion attributable to the intercarrier beat between it and the 45.75 megacycle video carrier of the selected signal.

Assuming switch 50 to be open, trap 42, 44 notches the response characteristic at 47.25 megacycles which provides approximately 76 db rejection of the upper adjacent channel sound signal component. In addition, any of the 47.25 megacycle signal which passes through inductor 45 is cancelled by a counterphase signal of the same frequency obtained by way of resistor 46 from the junction of elements 42, 44. The resulting overall bandpass characteristic of the IF network is denoted curve A in FIGURE 2.

With switch 50 closed, the secondary winding of transformer 42, 43 is shorted and develops a large circulating current. This shorted secondary, in effect, reduces the inductance of winding 42 and reduces the Q of trap circuit 42, 44. Since the inductance of inductor 42 has been reduced, the resonant frequency of the trap circuit is increased to approximately 47.75 megacycles. This may be varied by changing the turn ratio of windings 42, 43. The change in Q of the trap circuit causes less attenuation at the new resonant frequency. As shown in full-line curve B of FIGURE 2, the upward shift of the resonant frequency of the trap circuit produces a wider overall IF passband. This arrangement also provides a more linear phase characteristic which improves the quality of the reproduced image.

As shown, the change in the resonant frequency of the adjacent-sound-component trap circuit, resulting in increased picture quality, is caused by a reduction of the inductance in the trap. This change of inductance may be brought about in any number of ways. A predetermined number of turns of inductor 42 may be directly short circuited. In addition, various core materials, such as brass, may be inserted into the core of the inductor or, alternatively, the iron core of the inductor may be partially or entirely removed. These alternatives reduce the inductance and increase the width of the IF passband. Furthermore, the value of the trap capacitance may also be selectively varied to bring about the required shift in resonant frequency thereby increasing the quality of the reproduced image in areas which experience no adjacent channel problems.

Thus, the invention provides a new and improved circuit for increasing the performance of a television receiver. By employing a switching arrangement in conjunction with a sound trap circuit the bandpass characteristic may be selectively enlarged and linearized resulting in a reproduced image of increased quality.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A television receiver for reproducing information from adjacent channel transmitted signals each having a sound-signal-component frequency and a picture-signal-component frequency, said receiver comprising:

(a) circuit means for selecting one of said transmitted signals;

(b) means coupled to said circuit means for translating said selected signal and for rejecting the sound-signal-component frequency of the adjacent one of said transmitted signals;

(c) and means, including a switch, for selectively rendering said sound-signal-component frequency rejecting means at least partially ineffective.

2. A television receiver for reproducing information from adjacent channel transmitted signals each having a sound-signal-component frequency and a picture-signal-component frequency, said receiver comprising:

(a) circuit means for selecting one of said transmitted signals;

(b) means coupled to said circuit means for translating said selected signal and for rejecting the sound-signal-component frequency of the adjacent one of said transmitted signals;

(c) a switch;

(d) and means reactively coupled to said sound-signal-component frequency rejecting means and responsive to actuation of said switch for selectively rendering said rejecting means at least partially ineffective.

3. A television receiver for reproducing information from adjacent channel transmitted signals each having a sound-signal-component frequency and a picture-signal-component frequency, said receiver comprising:

(a) circuit means for selecting one of said transmitted signals;

(b) means coupled to said circuit means for translating said selected signal and including a shunt trap circuit series resonant at the sound-signal-component frequency of the adjacent one of said transmitted signals for attenuating the sound component of said adjacent signal;

(c) and means for selectively effecting a predetermined step-increase in the resonant frequency of said trap circuit to render said trap circuit partially ineffective and broaden and linearize the frequency response characteristic of said signal-translating means.

4. A television receiver for reproducing information from adjacent channel transmitted signals each having a sound-signal-component frequency and a picture-signal-component frequency, said receiver comprising:

(a) circuit means for selecting one of said transmitted signals;

(b) means coupled to said circuit means for translating said selected signal and including a resonant trap circuit for rejecting the sound-signal-component frequency of the adjacent one of said transmitted signals;

(c) a switch;

(d) and means coupled to said trap circuit and responsive to actuation of said switch for changing the resonant frequency thereof by a predetermined amount to rendering said trap circuit partially ineffective and linearize the frequency response characteristic of said signal-translating means.

5. A television receiver for reproducing information from adjacent channel transmitted signals each having a sound-signal-component frequency and a picture-signal-component frequency, said receiver comprising:

(a) circuit means for selecting one of said transmitted signals;

(b) means coupled to said circuit means for translating said selected signal and including a shunt trap circuit series resonant at the sound-signal-component frequency of the adjacent one of the transmitted signals for rejecting the sound component of said adjacent signal;

(c) and means for selectively associating a shorted turn in coupled relation to said trap circuit to change the resonant frequency of said trap circuit and render said trap circuit at least partially ineffective.

References Cited by the Examiner

UNITED STATES PATENTS

| | | | |
|---|---|---|---|
| 2,907,960 | 10/59 | Avins | 333—76 |
| 3,025,343 | 3/62 | Waring | 178—5.8 |

OTHER REFERENCES

"Trap in Color TV Receivers," by M. Mandl Radio-Electronics, April 1956; pages 52 and 53.

DAVID G. REDINBAUGH, *Primary Examiner.*

ROY LAKE, *Examiner.*